_United States Patent_ [19]

Kieser et al.

[11] Patent Number: 5,520,956

[45] Date of Patent: May 28, 1996

[54] COATINGS

[75] Inventors: Manfred Kieser, Darmstadt; Alfred Hennemann, Frankfurt, both of Germany

[73] Assignee: Merck Patent Gesellschaft mit beschrankter Haftung, Darmstadt, Germany

[21] Appl. No.: 150,921

[22] Filed: Nov. 12, 1993

[30]   Foreign Application Priority Data

Nov. 13, 1992 [DE] Germany ............... 42 38 380.3

[51] Int. Cl.$^6$ ............... B05D 1/36; B05D 3/02; B05D 7/16
[52] U.S. Cl. ............... 427/203; 427/195; 427/201; 427/202; 427/375; 427/407.1
[58] Field of Search ............... 427/205, 195, 427/407.1, 409, 404, 191, 203, 202, 196, 218, 214, 375

[56]   References Cited

U.S. PATENT DOCUMENTS

| | | | |
|---|---|---|---|
| 3,445,310 | 5/1969 | Danielson et al. | 427/195 |
| 3,713,870 | 1/1973 | Kaye | 427/404 |
| 4,097,639 | 6/1978 | Millar | 427/160 |
| 4,323,600 | 4/1982 | Sakata et al. | 427/202 |
| 4,358,508 | 11/1982 | Tanaka et al. | 427/195 |
| 4,599,251 | 7/1986 | Feller | 427/214 |
| 4,621,399 | 11/1986 | Qureshi et al. | 29/33 D |
| 4,684,548 | 8/1987 | Chretien | 427/202 |
| 4,696,860 | 9/1987 | Epperson | 427/214 |
| 4,835,023 | 5/1989 | Taniguchi et al. | 427/218 |
| 4,882,205 | 11/1989 | Valenduc | 427/202 |
| 4,929,475 | 5/1990 | de Jong | 427/375 |
| 4,948,631 | 8/1990 | Ostertag et al. | 427/218 |
| 5,194,209 | 3/1993 | Schwaegerle | 427/209 |
| 5,366,763 | 11/1994 | McDaniel | 427/204 |
| 5,368,885 | 11/1994 | Fotiou | 427/204 |
| 5,418,056 | 5/1995 | Noguchi et al. | 427/191 |
| 5,441,761 | 8/1995 | Miller | 427/205 |

FOREIGN PATENT DOCUMENTS 61-108635  5/1986  Japan ............... 427/398.1

OTHER PUBLICATIONS

Hackh's Chemical Dictionary, Fourth Edition, pp. 493 and 409, 1969 (no month).

_Primary Examiner_—Diana Dudash
_Attorney, Agent, or Firm_—Millen, White, Zelano & Branigan

[57]   ABSTRACT

The present invention relates to a method for coating substrate materials with polymers containing lustre pigments, in which a substrate has applied to it a curable coating, followed by a coat of lustre pigments or lustre pigment mixtures and then a clear coat.

8 Claims, No Drawings

COATINGS

The present invention relates to a method for coating substrate materials with polymers containing lustre pigments, in which a substrate has applied to it a curable coating, followed by a coat of lustre pigments or lustre pigment mixtures and, if desired, a clear coat.

Coatings are generally produced by the application of complete coating compositions, i.e. coating systems which on application contain all the necessary constituents of a coating, such as binders, pigments, fillers, additives, solvents, etc.

For certain applications, other methods are known in which the binder and the special effect substance are applied separately, for example flock coating, scatter coating, fibre spraying, etc.

Coatings which are carried out with liquid or powder coatings are employed as complete systems. In some cases this can, however, lead to considerable application problems, for example in the case of powder coatings containing pearl lustre pigments or metallic effect pigments.

In the production of powder coatings all of the constituents are mixed in the melt in extruders and the extruded powder coating mix is supplied in pieces as solid material to a mill. There it is ground to the particle size required for the application.

In this grinding process, a large proportion of the flakes of the lustre pigment is destroyed, leading to a reduction in the lustre effect.

The object was therefore to provide a coating method in which polymer coatings containing pearl lustre pigments and/or metallic effect pigments do not have the abovementioned disadvantages.

This object has been achieved by the present invention in that it has been found that, when a curable pigmented or unpigmented coating is applied to a substrate and a lustre pigxnent or lustre pigment mixture and, possibly, a clear coat are applied atop, and the curable coating or even both coatings are melted and, if appropriate, cured, it is possible to obtain optimum lustre effects in coatings and coating compositions, especially powder coatings.

The invention accordingly provides a method for coating substrate materials with polymers containing lustre pigments, characterised in that the substrate has ayelied to it first a coating which is curable after application, including coatings which remain curable temporarily, or shortly after application, and then a layer of lustre pigments in powder form and additionally, if desired, a clear coat and subsequently the curable coating or else both coatings are melted and, if appropriate, cured.

The coatings according to the invention can be applied to any desired substrate materials, for example metals such as iron, steel, aluminium, copper, bronze, brass and metal foils, but also other metal-coated surfaces such as glass, ceramic and concrete, and also to wood, for example furniture, to clay, paper, packaging materials, for example plastic containers, sheets or cardboard, or to other materials for decorative and/or protective purposes.

Any conventional coating system which remains at at least temporarily curable after application can be employed; in this case coating system means solvent/binder systems or solventless binder systems with which, using physical or chemical methods, for example drying at room temperature or elevated temperatures of up to about 200° C., chemical crosslinking or crosslinking induced by radiation, for example UV radiation, and/or polymerisation and other conventional treatment methods, it is possible to produce smooth, solid films with good gloss and good adhesion. Powder coatings are preferred.

Examples of binders which can be employed are natural resins, such as rosin, dammar, copals and shellac, binders based on vegetable and animal drying oils, cellulose esters, condensation resins containing formaldehyde, polyesters, polyamides, polyvinyl resins, acrylic and methacrylic resins, and polyurethanes and epoxy resins.

A review of suitable binders can be found in, for example, H. Kittel, Lehrbuch der Lacke und Beschichtungen [Textbook of Paints and Coatings], Volume I, Parts 1, 2 and 3, and in Karsten, Lackrohstofftabellen, 9th edition, pp. 55–558.

Depending on the substrate to be coated and the intended use, the person skilled in the art is able to select a suitable binder on the basis of his or her technical knowledge.

These binders are generally employed together with organic solvents, for example aliphatic or aromatic hydrocarbons, terpenes, chlorinated hydrocarbons, alcohols, ketones, esters, ethers and glycol ethers, or else in aqueous dispersion in which case low solids (10–30% solids), medium solids (30–60% solids) or high solids (60–80% solids) formulations may be employed. The solids contents may also, however, be above or below those stated, with formulations having up to 100% solids being possible (powder coatings).

A compilation of conventionally employed solvents can be found in Ullmann: Enzyklopädie der technischen Chemie [Encyclopaedia of Industrial Chemistry], 4th edition, Volume 16, pp. 296–308 and in H. Kittel: Lehrbuch Lacke und Beschichtungen, Volume III, pp. 72–134 and Karsten: Lackrohstofftabellen, 9th edition, pp. 601–619. A compilation of conventional binder/solvent systems can also be found in U.S. Pat. No. 4,551,491 and in European Patent Applications EP 0 473 033 A1 and EP 0 475 108 and the literature cited therein.

The lustre pigments employed in the coating according to the invention are metallic effect pigments, such as iron oxide in flake form and aluminium flakes, and pearl lustre pigments—pigments of mica flakes coated with metal oxides. The latter are known from, for example, German Patents and Patent Applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602, 32 35 017, 33 34 598 and 35 28 256.

The coat of lustre pigments may comprise only metallic effect pigments or pearl lustre pigments, but may also comprise a pearl lustre/metallic effect pigment mixture.

An essential constituent of the coating is the lustre pigment, which is applied as a thin coat to the curable coating initially produced on the substrate. In this context pigment coats of 0.1–20 $g/m^2$, preferably 1–10 $g/m^2$, are especially suitable.

The method is described in detail below. In the first step a meltable coating, in particular a powder coating at a thickness of approximately 5–50 μm, preferably 10–30 μm, is applied to the substrate material to be coated so that the substrate surface is completely covered by a homogeneous coating film. Onto the coated substrate the lustre pigment or lustre pigment mixture is applied by a conventional method, for example application from a fluidized bed, brushing, spraying, trickle-coating or dipping. An excess of pigment may possibly have to be removed mechanically. However, with optimum process control this is unnecessary in most cases. The entire base coating is then melted at temperatures in the range from 50° to 250° C., preferably 80°–200° C., and, if appropriate, cured.

A top coat can then be applied to this special-effect coating to improve the surface quality, the top coat comprising one or more clear coats, for example an aqueous coating or powder coating, whereby in general an improvement both in the appearance and in the durability of the overall coating is obtained. However, the transparent finishing coat is not absolutely necessary.

The melting and, if appropriate, curing of base coat and clear coat may also take place at the same time.

The coatings are each applied in one or more passes by conventional methods, for example spraying or dipping, with the base coat having a thickness of approximately 5–50 μm, preferably approximately 10–30 μm, and the optionally applied clear coat having a thickness of approximately 20–250 μm, preferably 50–150 μm.

The coatings obtained display interesting lustre color effects, since the particles of lustre pigment are very well oriented within the coating. Since each of the two or three system components—base coat, pearl lustre pigment and finishing coat—can be varied independently of one another, a great variety of color effects is possible.

When using powder coatings, all of the two or three components of the system are completely recyclable since, by suitable process control, mixing of the individual components can be avoided.

Without further elaboration, it is believed that one skilled in the art can, using the preceding description, utilize the present invention to the fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding application P 42 38 380.3 of Nov. 13, 1992, are hereby incorporated by reference.

The examples which follow are intended to illustrate the invention without limiting it:

EXAMPLE 1

Teodur PUR 00013 colorless, a powder coating from Teodur NV Breda, NL, is applied electrostatically to an aluminium panel and melted at about 100° C. to give a not yet fully cured film (thickness of coat about 50 μm). Subsequently, Iriodin 504 (an $Fe_2O_3$-coated mica pigment with a particle size of 10–60 μm from E. Merck, Darmstadt) is applied, also electrostatically, in a thin coat i.e. 3 $g/m^2$. The coated aluminium panel is fully cured over 15 minutes at 180° C.

A brilliant coating with a metallic shine is obtained.

EXAMPLE 2

The coated aluminium panel obtained in Example 1 is additionally coated with a clear, high-gloss powder coating (Teodur PUR 00013, colorless, from Teodur) and stored over 15 minutes at 180° C.

A brilliant coating with a strong metallic shine is obtained.

EXAMPLE 3

Interport 600 transparent, a powder coating from International Powder Coating, is applied similarly to Example 1 to an aluminium panel and melted at about 100° C. to give a not yet fully hardened film. In the following step, Iriodin 504 (an $Fe_2O_3$-coated mica pigment with a particle size of 10–60 μm from E. Merck, Darmstadt) is applied in a thin coat (about 5 $g/m^2$) by spraying. Coating is then carried out again using the clear coat powder Interpon 600 transparent. The coated panel is fully cured over 15 minutes at 180° C.

A brilliant coating with a strong metallic shine is obtained.

EXAMPLE 4

Interpon 600 black, a powder coating from International Powder Coating is applied similarly to Example 1 to an aluminium panel and melted at about 100° C. to give a not yet fully hardened film. In the following step a coat of 2 $g/m^2$ of a flake-shaped aluminium pigment in powder form (Standoft Aluminiumpulver Spezial PC 20 from Eckart) is applied by spraying. Coating is then carried out using Interpon 600 transparent, a clear coat powder from International Powder Coating. The coated panel is fully cured over 15 minutes at 180° C.

A brilliant coating with a dark metallic shine and high surface gloss is obtained.

We claim:

1. A method for coating substrate materials with polymers containing pearl lustre pigments, which comprises applying to a substrate a curable coating, applying to said curable coating pearl lustre pigments in powder form and melting said curable coating and, if appropriate, curing said curable coating and applying a clear coat over the curable coating prior to melting and curing the curable coating.

2. A method according to claim 1, wherein said curable coating contains 0.1 to 20 $g/m^2$ of pearl lustre pigments.

3. A method according to claim 1, wherein curable coating is melted at temperatures from 50° to 250° C.

4. A method according to claim 1, wherein the curable coating is a powder coating.

5. A method according to claim 1, wherein the clear coating is a powder coating.

6. A method as in claim 1, wherein the curable coating is partially cured after application to said substrate.

7. A method as in claim 1, wherein the curable coating remains curable temporarily after application to said substrate.

8. A method for coating substrate materials with polymers containing pearl lustre pigments to provide coatings with lustre color effects, which comprises applying to a substrate a curable coating, applying to said curable coating pearl lustre pigments in powder form, applying a clear coat over the curable coating and melting said curable coating and, if appropriate, curing said curable coating.

* * * * *